United States Patent
Kim et al.

(10) Patent No.: US 7,758,984 B2
(45) Date of Patent: Jul. 20, 2010

(54) SHIFT REACTOR, FUEL CELL SYSTEM EMPLOYING THE SAME, AND OPERATING METHOD OF THE SAME

(75) Inventors: Soonho Kim, Seoul (KR); Doohwan Lee, Daejeon-si (KR); Hyun-chul Lee, Yongin-si (KR); Dong-woo Lee, Seoul (KR); Tae-sang Park, Suwon-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 781 days.

(21) Appl. No.: 11/496,502

(22) Filed: Aug. 1, 2006

(65) Prior Publication Data
US 2007/0028523 A1   Feb. 8, 2007

(30) Foreign Application Priority Data
Aug. 2, 2005   (KR) .................... 10-2005-0070647

(51) Int. Cl.
*H01M 8/04* (2006.01)
*C01B 3/24* (2006.01)

(52) U.S. Cl. .................................. 429/17; 423/650
(58) Field of Classification Search .......... 429/17, 429/20
See application file for complete search history.

(56) References Cited

U.S. PATENT DOCUMENTS

| | | | |
|---|---|---|---|
| 6,667,123 B2 * | 12/2003 | Yu | ............... 429/17 |
| 6,753,107 B2 * | 6/2004 | Huang | ............... 429/17 |
| 6,835,219 B2 | 12/2004 | Gittleman | |
| 6,838,062 B2 | 1/2005 | Goebel et al. | |
| 2004/0067395 A1 * | 4/2004 | Nakata et al. | ............... 429/19 |
| 2007/0028523 A1 | 2/2007 | Kim et al. | |

FOREIGN PATENT DOCUMENTS

| CN | 1271330 A | 10/2000 |
|---|---|---|
| CN | 1509205 A | 6/2004 |
| CN | 100483825 C | 4/2009 |

(Continued)

OTHER PUBLICATIONS

Certificate of Patent No. ZL 200610146373, issued by the Chinese Intellectual Property Office on Apr. 29, 2009.

(Continued)

*Primary Examiner*—Melvin C Mayes
*Assistant Examiner*—Kenneth Vaden
(74) *Attorney, Agent, or Firm*—Stein McEwen, LLP

(57) ABSTRACT

A shift reactor for fuel cells, a fuel cell system employing the same, and an operating method of the same are provided. More particularly, a shift reactor for fuel cells is filled with a shift catalyst and includes an inlet through which reactants flow into the shift reactor and an outlet through which products flow out of the shift reactor. An oxygen supply duct and a valve capable of regulating the oxygen supply are positioned at the outlet side of the shift reactor. The oxygen supply allows for the temperature of the shift catalyst to be increased rapidly at startup, thereby significantly shortening the startup time of the shift reactor and thereby contributing to an improved practical operation of the fuel cell system.

17 Claims, 4 Drawing Sheets

FOREIGN PATENT DOCUMENTS

| | | |
|---|---|---|
| JP | 2000-277139 | 10/2000 |
| JP | 2001-23675 | 1/2001 |
| JP | 2002-87802 | 3/2002 |
| JP | P2003-89505 A | 3/2003 |
| JP | 2005-50563 | 2/2005 |

OTHER PUBLICATIONS

Japanese Office Action issued Mar. 16, 2010 in corresponding Japanese Application No. 2006-211179.

* cited by examiner

SHIFT REACTOR, FUEL CELL SYSTEM EMPLOYING THE SAME, AND OPERATING METHOD OF THE SAME

CROSS-REFERENCE TO RELATED APPLICATION

This application claims the benefit of Korean Patent Application No. 2005-70647, filed on Aug. 2, 2005, in the Korean Intellectual Property Office, the disclosure of which is incorporated herein in its entirety by reference.

BACKGROUND OF THE INVENTION

1. Field of the Invention

Aspects of the present invention relate to a shift reactor for fuel processors, a fuel cell system employing the same, and an operating method of the same. More particularly, aspects of the present invention relate to a shift reactor for fuel processors which maintains activities of the shift catalyst without complicated supplementary devices and which remarkably shortens the startup time of the shift reactor, a fuel cell system employing the same, and an operating method of the same.

2. Description of the Related Art

A fuel cell is a type of energy generating device in which energy from a chemical reaction between hydrogen and oxygen ($O_2$) is directly converted into electrical energy, wherein the hydrogen is contained in a fuel such as methanol, ethanol or natural gas.

Such fuel cell systems include fuel cell stacks and fuel processors (FP) as main elements and further include fuel tanks, fuel pumps, etc., as sub-elements. The fuel cell stack forms the main body of the fuel cell and is formed of a structure having a plurality of layers of unit cells, which include membrane electrode assemblies (MEA) and separators.

The fuel stored in the fuel tank is supplied into the FP by the fuel pump. The FP reforms and purifies the fuel to generate hydrogen, and supplies the generated hydrogen into the fuel cell stack. In the fuel cell stack, the supplied hydrogen electrochemically reacts with oxygen to generate electrical energy.

In the FP, a hydrocarbon is reformed in a reforming process using a catalyst. Because the catalyst is easily poisoned by sulfur compounds, the sulfur compounds that are present in the fuel must be removed before the fuel is supplied into the FP. Therefore, a desulfurization process is performed prior to the reforming process (refer to FIG. 1).

When the hydrocarbon is reformed, not only hydrogen but also carbon dioxide and carbon monoxide are generated. However, the reformed fuel should not be directly supplied into the fuel cell stack, since carbon monoxide poisons catalysts are used for electrodes of the fuel cell stack. Instead, a shift process should first be performed to remove carbon monoxide so that the concentration of carbon monoxide is reduced below 5000 ppm.

Reactions such as a shift reaction, a methanation reaction and a PROX reaction described in Reaction Schemes 1 through 3 below are conventionally used to remove carbon monoxide (CO).

Reaction Scheme 1

$$CO + H_2O \longrightarrow CO_2 + H_2$$

Reaction Scheme 2

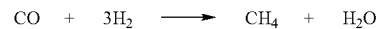

$$CO + 3H_2 \longrightarrow CH_4 + H_2O$$

Reaction Scheme 3

$$CO + 1/2 O_2 \longrightarrow CO_2$$

In order to lower the carbon monoxide concentration to less than 5000 ppm, the temperature of the shift reactor should be 150° C. or higher. However, preheating the shift reactor to the required temperature takes about one hour. This preheating time of one hour, which is required before electrical energy can be generated, is a disadvantage of the conventional startup method of a fuel cell. Thus, there is a need to shorten the required preheating time.

U.S. Pat. No. 6,835,219 discloses a fuel processor and a method of operating the same wherein the temperature of a shift reactor is rapidly increased by adsorption heat generated when water that has not reacted in the reforming reaction is adsorbed in a water adsorbent located at the inlet side of the shift reactor. However, a disadvantage of the fuel processor and the operating method thereof is that water is not sufficiently supplied into the shift reactor and therefore, the shift reaction does not occur sufficiently.

Additionally, U.S. Pat. No. 6,838,062 discloses a method of rapidly increasing the temperature of the main elements of a fuel cell by exchanging heat using a plurality of burner systems in a fuel processing system. However, the need for additional devices and control systems results in an increase in volume and costs, which are major drawbacks.

When a fuel cell system started up, fuel is supplied into a burner of a reformer, the fuel is burned, and the reformer is thereby heated. When the temperature of the reformer reaches a predetermined point, a reforming reaction is initiated by supplying the fuel into the reformer. However, when the temperature of the shift reactor is not high enough, water vapor contained in the reformed gas can condense in the shift reactor and thereby, the shift catalysts may be deactivated. Thus, the reformed fuel may bypass the shift reactor at this step. The indirect heat transferred from the reformer and the burner increases the temperature of the shift reactor. However, a long time is required to increase the temperature of the entire shift reactor, as illustrated in FIG. 2A.

Therefore, there is a need for a simple device that can rapidly increase the temperature of the shift reactor.

SUMMARY OF THE INVENTION

Aspects of the present invention provide a shift reactor which maintains activities of the shift catalyst without complicated supplementary devices and significantly shortens startup time of the shift reactor.

Aspects of the present invention also provide a fuel processor employing the shift reactor.

Aspects of the present invention also provide a fuel cell system employing the shift reactor.

Aspects of the present invention also provide a method of operating the shift reactor.

According to an aspect of the present invention, there is provided a shift reactor for a fuel processor for a fuel cell. The shift reactor comprises a shift catalyst layer comprising a shift catalyst, an inlet through which reactants flow into the shift reactor at an inlet side of the shift reactor and an outlet through which products flow out of the shift reactor at an outlet side of the shift reactor, and at least one oxygen supply duct positioned at the outlet side of the shift reactor that controllably supplies oxygen to the shift reactor. The shift reactor may further comprise a valve that controls the oxygen supply duct.

According to another aspect of the present invention, there is provided a fuel processor for fuel cells including the shift reactor.

According to another aspect of the present invention, there is provided a fuel cell system including the shift reactor and the fuel processor.

According to another aspect of the present invention, there is provided a method of operating the shift reactor for fuel cells including: increasing the temperature of the shift catalyst by supplying oxygen into the shift reactor through at least one oxygen supply duct positioned at the outlet side of the shift reactor; and supplying reformed fuel into the shift reactor when the temperature of any region of the shift catalyst is above the dew point of the reformed fuel.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
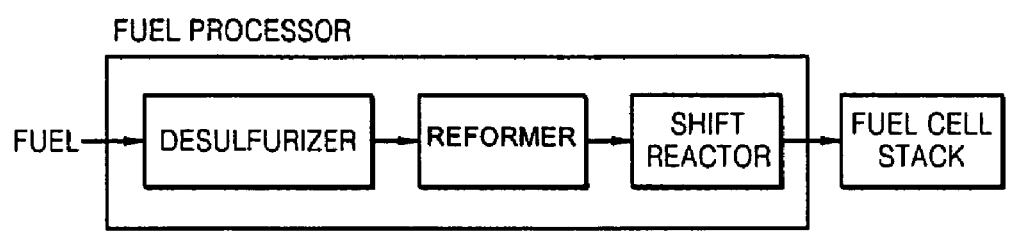
FIG. 1 is a conceptual diagram of a conventional fuel cell system.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2A:
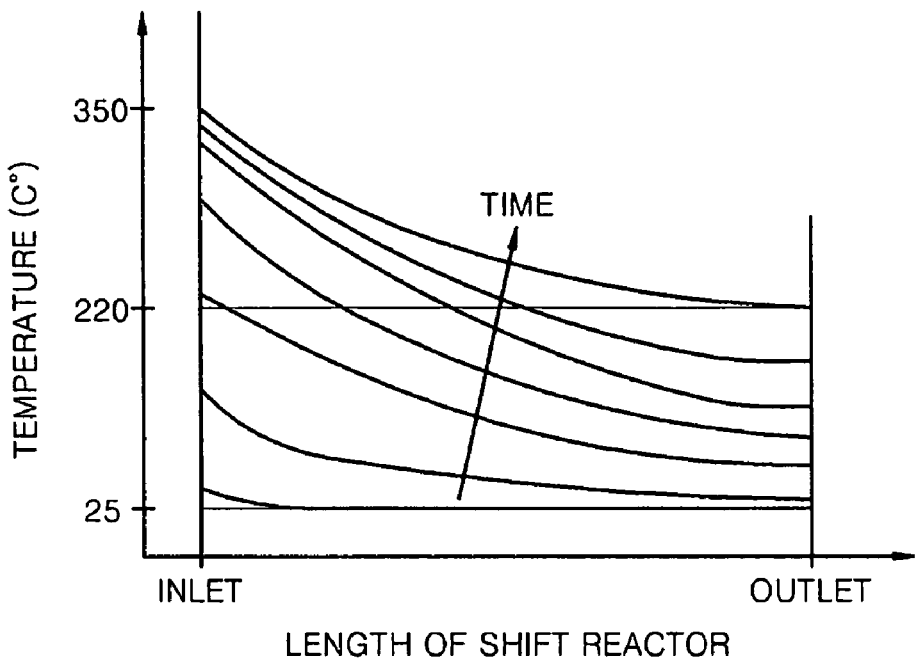
FIG. 2A is a temperature profile of a conventional shift reactor for fuel cells with respect to time.
Figure 2B:
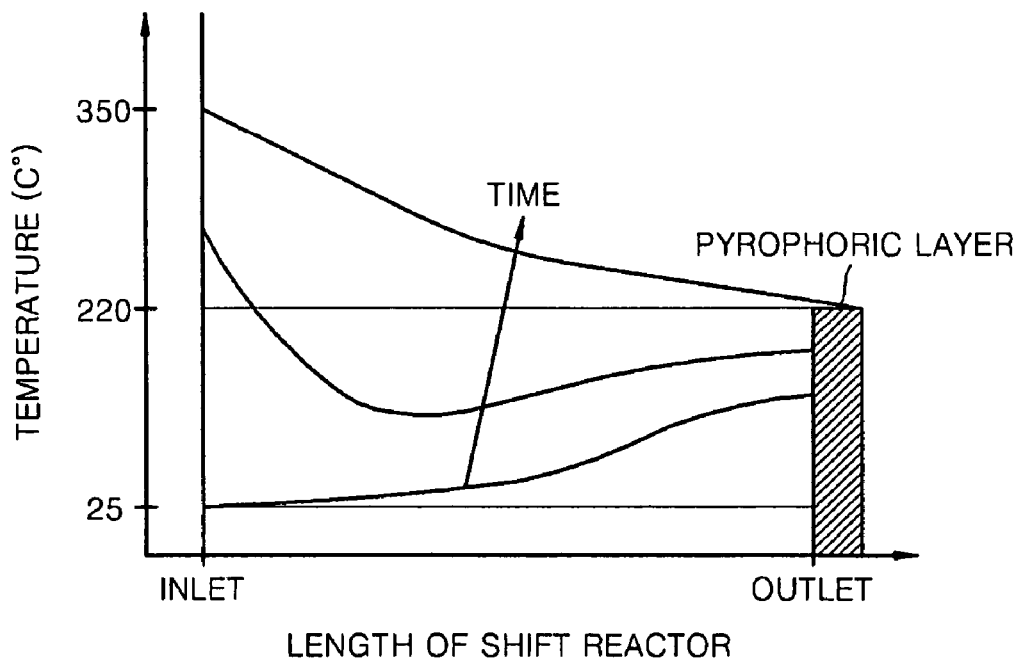
FIG. 2B is a temperature profile of a shift reactor for fuel cells with respect to time according to an embodiment of the present invention.

According to an embodiment of the present invention, a shift catalyst or pyrophoric material is oxidized with oxygen supplied through an oxygen supply duct positioned at the outlet side of the shift reactor to generate heat. The temperature of the shift reactor can be increased rapidly by the generated heat, as shown in FIG. 2B. That is, the time that it takes to heat the entire shift reactor to a desired temperature can be significantly decreased by oxidizing the shift catalyst layer or the pyrophoric layer at the outlet side of the shift reactor, which is the part of the shift reactor that takes the longest time to be heated. The shift catalyst or pyrophoric material is then reduced and returned to its original state by interaction with the supply of reformed fuel when the temperature of the shift reactor becomes high enough.

Figure 3:
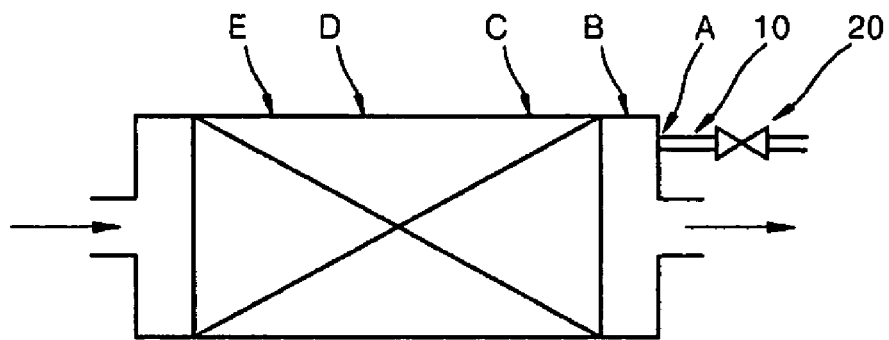
FIG. 3 is a simplified diagram of a shift reactor according to an embodiment of the present invention.

The shift reactor for fuel cells is filled with a shift catalyst and includes an inlet through which reactants flow into the shift reactor and an outlet through which products flow out of the shift reactor. Referring to FIG. 3, the shift reactor according to an embodiment of the present invention further includes an oxygen supply duct 10 at the outlet side of the shift reactor and a valve 20 that controls the oxygen supply When the valve 20 is open, oxygen is supplied through the oxygen supply duct 10 and oxidizes the shift catalyst, and thereby generating heat. The heat is transferred by conduction or convection to the inlet side of the shift reactor to increase the temperature of the shift catalyst.

The oxygen supply duct 10 may be positioned at the outlet side of the shift reactor. Particularly, the oxygen supply duct 10 may be positioned between the center of the shift reactor and the outlet. That is, for example, the oxygen supply duct 10 can be positioned at positions A, B or C in FIG. 3, but should not be positioned at D or E. When the oxygen supply duct is positioned at the inlet side, such as, for example, D or E in FIG. 3, the shift catalyst at the inlet side is oxidized, and thus cannot easily contribute to heating the outlet side of the shift reactor. Additionally, hydrogen that is generated in the reformer should be kept a sufficient distance away from the oxygen supplied into the shift reactor to prevent a violent reaction between the oxygen and the hydrogen.

The shift catalyst can be formed of Cu, Zn, Fe, Cr, Pt, Ru, or a mixture thereof. For example, copper can be used to contribute to heating the shift reactor as it generates heat during both oxidation and reduction reactions. The oxidation and reduction reactions are as follows:

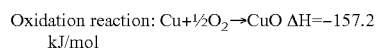
Oxidation reaction: $Cu + \frac{1}{2}O_2 \rightarrow CuO$ $\Delta H = -157.2$ kJ/mol

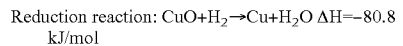
Reduction reaction: $CuO + H_2 \rightarrow Cu + H_2O$ $\Delta H = -80.8$ kJ/mol      Formula 1

Figure 4:
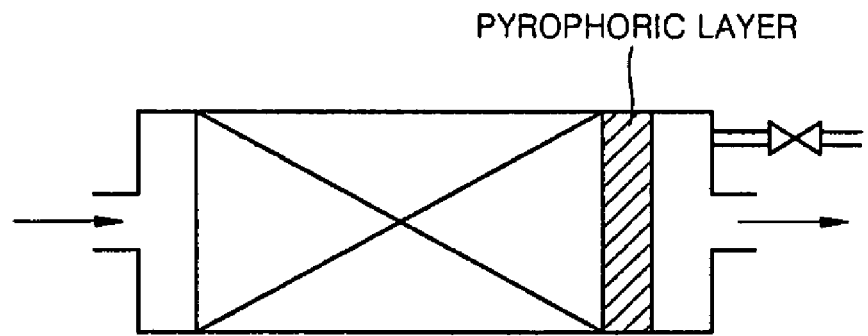
FIG. 4 is a simplified diagram of the location of a pyrophoric layer of the shift reactor according to another embodiment of the present invention.

Referring to FIG. 4, the shift reactor may further include a pyrophoric layer at the outlet side that contains a pyrophoric material that spontaneously oxidizes and generates heat when it comes into contact with oxygen. The pyrophoric layer may be disposed so that it contacts the shift catalyst layer (refer to FIG. 4).

The pyrophoric material may include transition metals, oxides thereof or mixtures thereof. The transition metal may include at least one selected from the group consisting of Cr, Mn, Fe, Co, Ni, Cu, Mo, Zn, Sn, Al, and Ti.

The pyrophoric material may have a large specific surface area so that the pyrophoric material can easily be oxidized or reduced. For example, the specific surface area of the pyrophoric material may be in the range of 40 $m^2/g$ to 3000 $m^2/g$. When the specific surface area of the pyrophoric material is less than 40 $m^2/g$, the oxidation and reduction reactions do not easily occur due to the small surface area. When the pyrophoric material has a specific surface area of 3000 $m^2/g$ or greater, manufacturing the pyrophoric material is difficult and the durability of the pyrophoric material decreases.

The heat of oxidation of the pyrophoric material may be in the range of 30 kcal/mol to 200 kcal/mol. When the heat of oxidation is less than 30 kcal/mol, the heating amount of the pyrophoric material is less than that of the shift catalyst, and thus the effect of the heat of oxidizing is not great. When the heat of reaction is higher than 200 kcal/mol, too much heat can be rapidly generated, which can damage the shift reactor.

The amount of the pyrophoric material may be in the range of 0.1 to 20 parts by weight based on 100 parts by weight of the shift catalyst. When the amount of the pyrophoric material is less than 0.1 parts by weight, the amount of heat generated by oxidation may not be enough, and thus the pyrophoric layer may have an insufficient effect. When the amount of the pyrophoric material is greater than 20 parts by weight, the volume of the reactor may be too large.

The pyrophoric layer can comprise not only pyrophoric material, but also may include the shift catalyst. For example, the particles of the pyrophoric material can be uniformly distributed among the particles of the shift catalyst. In such a structure, heat is transferred effectively using a decreased amount of pyrophoric material.

Figure 5:
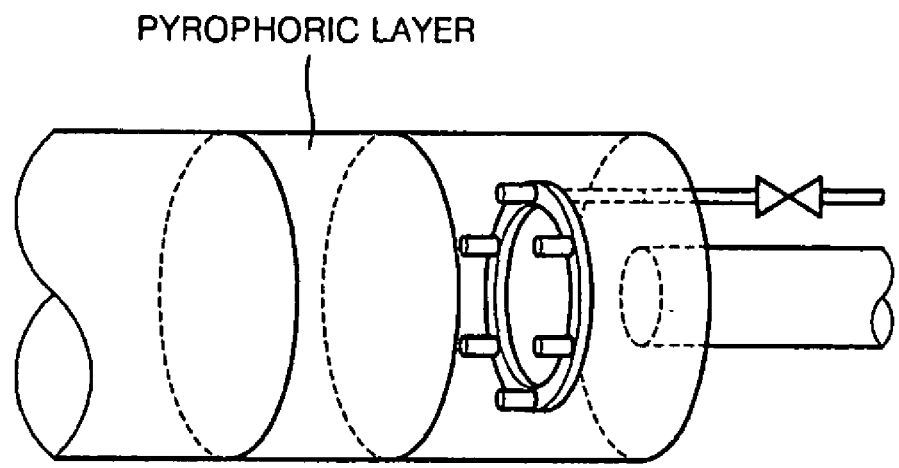
FIG. 5 is a simplified diagram of an operation of a distributor of the shift reactor according to another embodiment of the present invention.

The shift reactor may further include a distributor that helps uniformly supply oxygen to the entire outlet side of the shift reactor. The distributor is connected to the oxygen supply duct and evenly supplies oxygen. The size and structure of the distributor can be adjusted according to the size of the shift reactor, the packing states of the catalyst and the location of the oxygen supply duct. The size and structure of the distributor are not limited. For example, the distributor may have a structure as illustrated in FIG. 5 in which a plurality of nozzles are formed on a round manifold and the oxygen supply ducts are connected to the manifold. It is advantageous that the temperature of the entire shift reactor can be uniformly increased by uniformly supplying oxygen into the pyrophoric layer using such a distributor.

Accordingly, one or more oxygen supply ducts can be employed. The oxygen ducts may be symmetrically arranged around the outlet in consideration of the mechanical stability of the entire shift reactor.

Aspects of the present invention provide a fuel processor for fuel cells including the shift reactor described above.

The fuel processor for fuel cells including the shift reactor according to an embodiment of the present invention can further include a reformer besides the shift reactor, and may further include a desulfurizer and a preferential oxidation (PROX) reactor. The structure of the desulfurizer, reformer and PROX reactor can be any structure known in the art and is not limited.

Aspects of the present invention provide a fuel cell system including the shift reactor described above.

The fuel cell system including the shift reactor according to an embodiment of the present invention can further include a reformer and a fuel cell stack in addition to the shift reactor, and may further include a desulfurizer and a PROX reactor. The structure of the desulfurizer, reformer and PROX reactor can be any structure known in the art and is not limited.

A method of operating the shift reactor for fuel cells according to an embodiment of present invention includes: increasing the temperature of the shift catalyst by supplying oxygen into the shift reactor through an oxygen supply duct positioned at the outlet side of the shift reactor; and supplying reformed fuel into the shift reactor when the temperature of any region of the shift catalyst layer is above the dew point of the reformed fuel. Although not required in every aspect, supplying the reformed fuel to the shift reactor may be initiated when the temperature of the portion that has the lowest temperature in the shift catalyst is above the dew point of reformed fuel. In other words, supplying the reformed fuel may be initiated when all regions of the shift catalyst layer have a temperature that is above the dew point of the reformed fuel.

When oxygen is supplied through the oxygen supply duct, such as, for example, at the start-up of the fuel cell when the shift reactor temperature has not yet been raised, the reformed fuel is initially not supplied. The reason is that water vapor can condense and the shift catalyst may be deactivated if the temperature of the shift catalyst is less than the dew point of the reformed fuel. Thus, supplying the reformed fuel can be initiated after the temperature of any region of the shift catalyst layer is above the dew point of the reformed fuel. Although not required in every aspect, supplying the reformed fuel may be initiated when the temperature of all regions of the shift catalyst layer is above the dew point of the reformed fuel.

Temperature measuring devices such as thermocouples can be installed in several regions of the shift catalyst to measure whether the temperature of the respective region of the shift catalyst is above the dew point. Particularly, the temperature measuring devices can be installed at 2 to 10 regions of the shift catalyst along the direction that the reactants flow.

The fuel passing through the shift reactor may not be directly supplied into the fuel cell system. Instead, the fuel may be supplied into the fuel cell system after the concentration of carbon monoxide at the outlet of the shift reactor has reached a level of less than 5000 ppm. The temperature at the outlet of the shift reactor may be in the range of 150° C. to 280° C. When the temperature of the outlet of the shift reactor is less than 150° C. or higher than 280° C., it is difficult to reduce the concentration of carbon monoxide to less than 5000 ppm.

The fuel from which the carbon monoxide has been removed in the shift reactor may be passed through a PROX reactor to further lower the concentration of carbon monoxide.

When the reformed fuel is supplied into the shift reactor, the oxygen supply can be stopped by blocking the oxygen supply duct.

The reformed fuel includes a relatively high fraction of hydrogen. When the reformed fuel is supplied to the shift reactor, the oxidized shift catalyst and/or the pyrophoric material composing the pyrophoric layer is reduced and returns to its original state prior to oxidation. The reduced shift catalyst and/or the pyrophoric material increase the temperature of the shift reactor by repeating the heat generating reactions whenever the fuel cell system initiates.

The shift reactor according to aspects of the present invention maintains activities of the shift catalyst without complicated supplementary devices and significantly shortens the startup time of the shift reactor by rapidly increasing the temperature of the shift catalyst layer, thereby contributing to an improved practical operation of the fuel cell system.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of operating a shift reactor for a fuel cell comprising a shift catalyst layer comprising a shift catalyst, a pyrophoric layer that comprises a pyrophoric material that spontaneously oxidizes when coming into contact with oxygen to generate heat and wherein the pyrophoric layer contacts the shift catalyst layer, an inlet through which reactants flow into the shift reactor at an inlet side of the shift reactor, an outlet through which products flow out of the shift reactor at an outlet side of the shift reactor, and at least one oxygen supply duct that controllably supplies oxygen to the shift reactor in an amount that oxidizes the shift catalyst or the pyrophoric layer and raises the temperature of the shift reactor and wherein the oxygen supply duct is positioned at the outlet side of the shift reactor, the method comprising:

increasing the temperature of the shift catalyst layer by supplying oxygen into the shift reactor through the at least one oxygen supply duct positioned at the outlet side of the shift reactor; and supplying reformed fuel into the shift reactor when the temperature of any region of the shift reactor catalyst layer is above the dew point of the reformed fuel wherein when the temperature of all regions of the shift catalyst layer is below the dew point of the reformed fuel, reformed fuel is not supplied into the shift reactor and oxygen is supplied into the shift reactor.

2. The method of claim 1, wherein the shift reactor further includes a valve controlling the oxygen supply duct.

3. The method of claim 1, wherein the pyrophoric layer comprises a material selected from the group consisting of transition metals, oxides thereof and mixtures thereof.

4. The method of claim 3, wherein the transition metal is at least one selected from the group consisting of Cr, Mn, Fe, Co, Ni, Cu, Mo, Zn, Sn, Al, and Ti.

5. The method of claim 3, wherein the pyrophoric layer comprises a material selected from the group consisting of particles of transition metals, oxides thereof and mixtures thereof, and wherein the specific surface area of the particles is in the range of 40 m$^2$/g to 3000 m$^2$/g.

6. The method of claim 1, wherein the pyrophoric material has a heat of oxidation in the range of 30 kcal/mol to 200 kcal/mol.

7. The method of claim 5, wherein the pyrophoric material has a heat of oxidation in the range of 30 kcal/mol to 200 kcal/mol.

8. The method of claim 1, wherein the pyrophoric layer comprises a mixture of particles of the shift catalyst and particles of the pyrophoric material and wherein the particles of the pyrophoric material are uniformly distributed among the particles of the shift catalyst.

9. The method of claim 1, wherein the amount of the pyrophoric material is in the range of 0.1 to 20 parts by weight based on 100 parts by weight of the shift catalyst.

10. The method of claim 1, wherein the shift reactor further comprises a distributor that is connected to the oxygen supply duct and that dispersively supplies oxygen inside the shift reactor.

11. The method of claim 1, wherein the shift reactor comprises a plurality of oxygen supply ducts.

12. The method of claim 11, wherein the plurality of oxygen supply ducts are symmetrically arranged around the outlet.

13. The method of claim 1, wherein the reformed fuel is supplied into the shift reactor when the temperature of all regions of the shift reactor catalyst layer is above the dew point of the reformed fuel.

14. The method of claim 1, wherein the shift catalyst and/or pyrophoric material are reduced and regenerated by blocking the at least one oxygen supply duct and supplying the reformed fuel.

15. A method of operating a shift reactor for a fuel cell comprising a shift catalyst layer comprising a shift catalyst, an inlet through which reactants flow into the shift reactor at an inlet side of the shift reactor, an outlet through which products flow out of the shift reactor at an outlet side of the shift reactor, and at least one oxygen supply duct that controllably supplies oxygen to the shift reactor in an amount that oxidizes the shift catalyst and raises the temperature of the shift reactor and wherein the oxygen supply duct is positioned at the outlet side of the shift reactor, the method comprising:

increasing the temperature of the shift catalyst layer by supplying oxygen into the shift reactor through the at least one oxygen supply duct positioned at the outlet side of the shift reactor; and supplying reformed fuel into the shift reactor when the temperature of any region of the shift reactor catalyst layer is above the dew point of the reformed fuel, wherein when the temperature of all regions of the shift catalyst layer is below the dew point of the reformed fuel, reformed fuel is not supplied into the shift reactor and oxygen is supplied into the shift reactor.

16. The method of claim 15, wherein the reformed fuel is supplied into the shift reactor when the temperature of all regions of the shift reactor catalyst layer is above the dew point of the reformed fuel.

17. The method of claim 15, wherein the shift catalyst is reduced and regenerated by blocking the at least one oxygen supply duct and supplying the reformed fuel.

* * * * *